United States Patent
Gyllenhammar et al.

(10) Patent No.: US 12,447,977 B2
(45) Date of Patent: Oct. 21, 2025

(54) EVENT BUFFER STORAGE PRIORITIZATION

(71) Applicant: Zenseact AB, Gothenburg (SE)

(72) Inventors: Magnus Gyllenhammar, Pixbo (SE); Majid Khorsand Vakilzadeh, Mölndal (SE)

(73) Assignee: Zenseact AB, Gothenburg (SE)

( * ) Notice: Subject to any disclaimer, the term of this patent is extended or adjusted under 35 U.S.C. 154(b) by 195 days.

(21) Appl. No.: 18/184,189

(22) Filed: Mar. 15, 2023

(65) Prior Publication Data

US 2023/0303093 A1  Sep. 28, 2023

(30) Foreign Application Priority Data

Mar. 22, 2022 (EP) ................................ 22163420

(51) Int. Cl.
  *B60W 50/02* (2012.01)
  *G06F 9/50* (2006.01)
(52) U.S. Cl.
  CPC ....... *B60W 50/0205* (2013.01); *G06F 9/5005* (2013.01); *B60W 2050/021* (2013.01)
(58) Field of Classification Search
  CPC ......... B60W 50/0205; B60W 2050/021; G06F 9/5005
  See application file for complete search history.

(56) References Cited

U.S. PATENT DOCUMENTS 12,128,887 B1 * 10/2024 Kiiski ............... B60W 30/0956
2017/0113664 A1  4/2017 Nix 2019/0297025 A1 * 9/2019 Kobayashi ............ H04L 47/568
2020/0193736 A1 * 6/2020 Lawrence .............. G07C 5/085
2020/0250901 A1  8/2020 Golov
(Continued)

FOREIGN PATENT DOCUMENTS

DE  102018204883 A1  10/2019

OTHER PUBLICATIONS

EPO Communication with European Search Report dated Sep. 5, 2022 for European Patent Application No. 22163420.7 filed Mar. 22, 2022, consisting of 8-pages.

*Primary Examiner* — Navid Z. Mehdizadeh
*Assistant Examiner* — Matthew Ho
(74) *Attorney, Agent, or Firm* — Weisberg I.P. Law, P.A.

(57) ABSTRACT

The present disclosure relates to a method performed by a buffer resources prioritizing system for storage prioritization in an event buffer configured to continuously collect operational data of an Automated Driving System, ADS, of a vehicle. The buffer resources prioritizing system obtains sensor data of one or more sensors onboard the vehicle. The buffer resources prioritizing system further determines, at least partly based on the sensor data, current ADS-related operational conditions at least comprising states of vehicle surroundings and internal states of the vehicle. Moreover, the buffer resources prioritizing system determines an upcoming scene predicted to evolve from the current operational conditions. Furthermore, the buffer resources prioritizing system deduces based on assessment of the predicted scene, a storage priority score thereof reflecting predicted relevance of freezing event data of the predicted scene in the event buffer. The disclosure also relates to a buffer resources prioritizing system.

18 Claims, 3 Drawing Sheets

(56) References Cited

U.S. PATENT DOCUMENTS

| | | |
|---|---|---|
| 2021/0319223 A1 | 10/2021 | Nagata et al. |
| 2023/0085296 A1* | 3/2023 | Liu ..................... G06N 3/0455 706/12 |

* cited by examiner

EVENT BUFFER STORAGE PRIORITIZATION

TECHNICAL FIELD

The present disclosure relates to storage prioritization in an event buffer—e.g. a FIFO buffer—configured to continuously collect operational data of an Automated Driving System, ADS, of a vehicle

BACKGROUND

Within the automotive field, there has for quite some years been activity in the development of autonomous vehicles. An increasing number of modern vehicles have advanced driver-assistance systems, ADAS, to increase vehicle safety and more generally road safety. ADAS—which for instance may be represented by adaptive cruise control, ACC, collision avoidance system, forward collision warning, etc.—are electronic systems that may aid a vehicle driver while driving. Moreover, in a not-too-distant future, Autonomous Driving, AD, will to a greater extent find its way into modern vehicles. AD along with ADAS will herein be referred to under the common term Automated Driving System, ADS, corresponding to all different levels of automation, for instance as defined by the SAE J3016 levels (0-5) of driving automation. An ADS may be construed as a complex combination of various components that can be defined as systems where perception, decision making, and operation of the vehicle—at least in part—are performed by electronics and machinery instead of a human driver. This may include handling of the vehicle, destination, as well as awareness of surroundings. While the automated system has control over the vehicle, it allows the human operator to leave all or at least some responsibilities to the system. To perceive its surroundings, an ADS commonly combines a variety of sensors, such as e.g. radar, LIDAR, sonar, camera, navigation and/or positioning system e.g. GNSS such as GPS, odometer and/or inertial measurement units, upon which advanced control systems may interpret sensory information to identify appropriate navigation paths, as well as obstacles and/or relevant signage.

When developing an ADS for the next generation ADAS features, it is crucial to have relevant data. Further, to meet shifting customer demands and changes to traffic dynamics, it is paramount to continuously measure and monitor events experienced by vehicles in a fleet, i.e. vehicles already put into market and that are in use, commonly referred to as production vehicles. It is, however, intractable to store and analyze all data experienced by the ADS vehicles, as this could amount to TBs of data for each single drive. There are multitudes of solutions focusing on identifying interesting scenarios and events in order to trigger data storage. Due to the nature of the validation and verification challenge to prove safety of ADSs, there is a pressing need to retain rare and edge cases. Further, particular events might pose high value to the continued development of the ADSs and/or sub-features thereof. To capture ongoing events and data in a vehicle, it is common to run an event buffer continuously collecting operational data of the ADS for temporary storage, e.g. through a FIFO (First In First Out) scheme. In many setups, it is not viable to have additional storage devices for more pertinent storage, e.g. due to product cost and/or equipment degradation from repeated writing to such pertinent storage device(s) e.g. hard-drive(s). Consequently, one may need to freeze—i.e. store—important events directly in the temporary—e.g. FIFO—buffer. For instance upon end of trip, these frozen events can be uploaded and/or transmitted—e.g. to a back office e.g. for further analysis and/or inclusion in ADS development—or if such a connection is not available, compute resources available e.g. when the vehicle is not in operations, may potentially be used to compress the frozen data. However, there is nonetheless a risk that the vehicle experiences several events before the frozen events can be e.g. unloaded and/or compressed. Accordingly, in cases where collected events are kept in a temporary—e.g. FIFO—buffer, there might not be enough buffer resources—e.g. should said buffer be highly utilized and/or running low on capacity—to properly log new events, e.g. entire onset(s) thereof.

SUMMARY OF THE INVENTION

It is therefore an object of embodiments herein to provide an approach for in an improved and/or alternative manner support storage prioritization in an event buffer—e.g. a FIFO buffer—configured to continuously collect operational data of a vehicle ADS.

The object above may be achieved by the subject-matter disclosed herein. Embodiments are set forth in the appended claims, in the following description and in the drawings.

The disclosed subject-matter relates to a method performed by a buffer resources prioritizing system for storage prioritization in an event buffer configured to continuously collect operational data of an ADS of a vehicle. The buffer resources prioritizing system obtains sensor data of one or more sensors onboard the vehicle. The buffer resources prioritizing system further determines, at least partly based on the sensor data, current ADS-related operational conditions at least comprising states of vehicle surroundings and internal states of said vehicle. Moreover, the buffer resources prioritizing system determines an upcoming scene predicted to evolve from the determined current operational conditions. Furthermore, the buffer resources prioritizing system deduces based on assessment of the predicted scene, a storage priority score thereof reflecting predicted relevance of freezing event data of the predicted scene in the event buffer.

The disclosed subject-matter further relates to a buffer resources prioritizing system for—and/or adapted and/or configured for—storage prioritization in an event buffer configured to continuously collect operational data of an ADS of a vehicle. The buffer resources prioritizing system comprises a sensor data obtaining unit for obtaining sensor data of one or more sensors onboard the vehicle. The buffer resources prioritizing system further comprises an operational conditions determining unit for determining, at least partly based on the sensor data, current ADS-related operational conditions at least comprising states of vehicle surroundings and internal states of the vehicle. Moreover, the buffer resources prioritizing system comprises a scene prediction unit for determining an upcoming scene predicted to evolve from the current operational conditions. Furthermore, the buffer resources prioritizing system comprises a priority deducing unit for deducing based on assessment of the predicted scene, a storage priority score thereof reflecting predicted relevance of freezing event data of the predicted scene in the event buffer.

Furthermore, the disclosed subject-matter relates to a vehicle comprising a buffer resources prioritizing system as described herein.

Moreover, the disclosed subject-matter relates to a computer program product comprising a computer program containing computer program code means arranged to cause a computer or a processor to execute the steps of the buffer resources prioritizing system described herein, stored on a computer-readable medium or a carrier wave.

The disclosed subject-matter further relates to a non-volatile computer readable storage medium having stored thereon said computer program product.

Thereby, there is introduced an approach supporting and/or enabling events deemed—e.g. most—valuable and/or important, to be captured and not lost. That is, since there is obtained sensor data of one or more sensors onboard the vehicle, there is e.g. continuously and/or intermittently—for instance while the vehicle is traveling—derived and/or buffered from various onboard sensors, data indicative of current sensory information, such as e.g. from surrounding detecting sensors, brake sensor(s), and/or malfunction sensor(s), etc. Furthermore, that is, since there is determined, at least partly based on the sensor data, current ADS-related operational conditions at least comprising states of vehicle surroundings and internal states of the vehicle, there is derived ongoing or essentially ongoing—and/or recently ongoing e.g. ranging back a predeterminable time period e.g. up to several seconds—operational conditions affecting—and/or being relevant in view of—the ADS, including state(s) of vehicle surroundings and internal state(s) of the vehicle, and/or of the ADS and/or of a software thereof. Moreover, that is, since there is determined an upcoming scene predicted to evolve from the determined current ADS-related operational conditions, there is based on said conditions predicted emanating from said operational conditions, a—e.g. triggering event-inducing—scene estimated to occur within a near future and/or at an upcoming point in time. Accordingly, there is predicted—for instance continuously and/or intermittently e.g. as the vehicle is traveling—potential upcoming one or more scenes expected to invoke and/or call for data storage and/or data collection in the event buffer, of operational data of the vehicle. Furthermore, that is, since there is deduced based on assessment of the predicted scene, a storage priority score thereof reflecting predicted relevance of freezing event data of the predicted scene in the event buffer, there is by assessment of the predicted upcoming scene calculated and/or predicted the relevance of data collection in view thereof. That is, by analysing the—from the current ADS-related operational conditions—predicted upcoming scene, there is determined a priority of said scene in terms of storing event data associated therewith in the event buffer. Thus, a certain predicted upcoming scene may be deduced to be associated with a certain storage priority score, while another predicted upcoming scene may be deduced to be associated with another storage priority score, e.g. of higher—or lower—value. For instance, a predicted upcoming scene associated with a rare and/or edge event may be ranked higher—such as have a higher storage priority score—than another—e.g. more common—predicted upcoming scene. Accordingly, with the introduced concept, differing predicted scenes may be attributed and/or augmented with differing respective predicted storage priority scores, thus supporting and/or enabling predicted upcoming scenes to be predictively ranked and/or prioritized.

For that reason, an approach is provided for in an improved and/or alternative manner support storage prioritization in an event buffer—e.g. a FIFO buffer—configured to continuously collect operational data of a vehicle ADS.

The technical features and corresponding advantages of the above-mentioned method will be discussed in further detail in the following.

BRIEF DESCRIPTION OF THE DRAWINGS

The various aspects of the non-limiting embodiments, including particular features and advantages, will be readily understood from the following detailed description and the accompanying drawings, in which.

DETAILED DESCRIPTION

Figure 1:
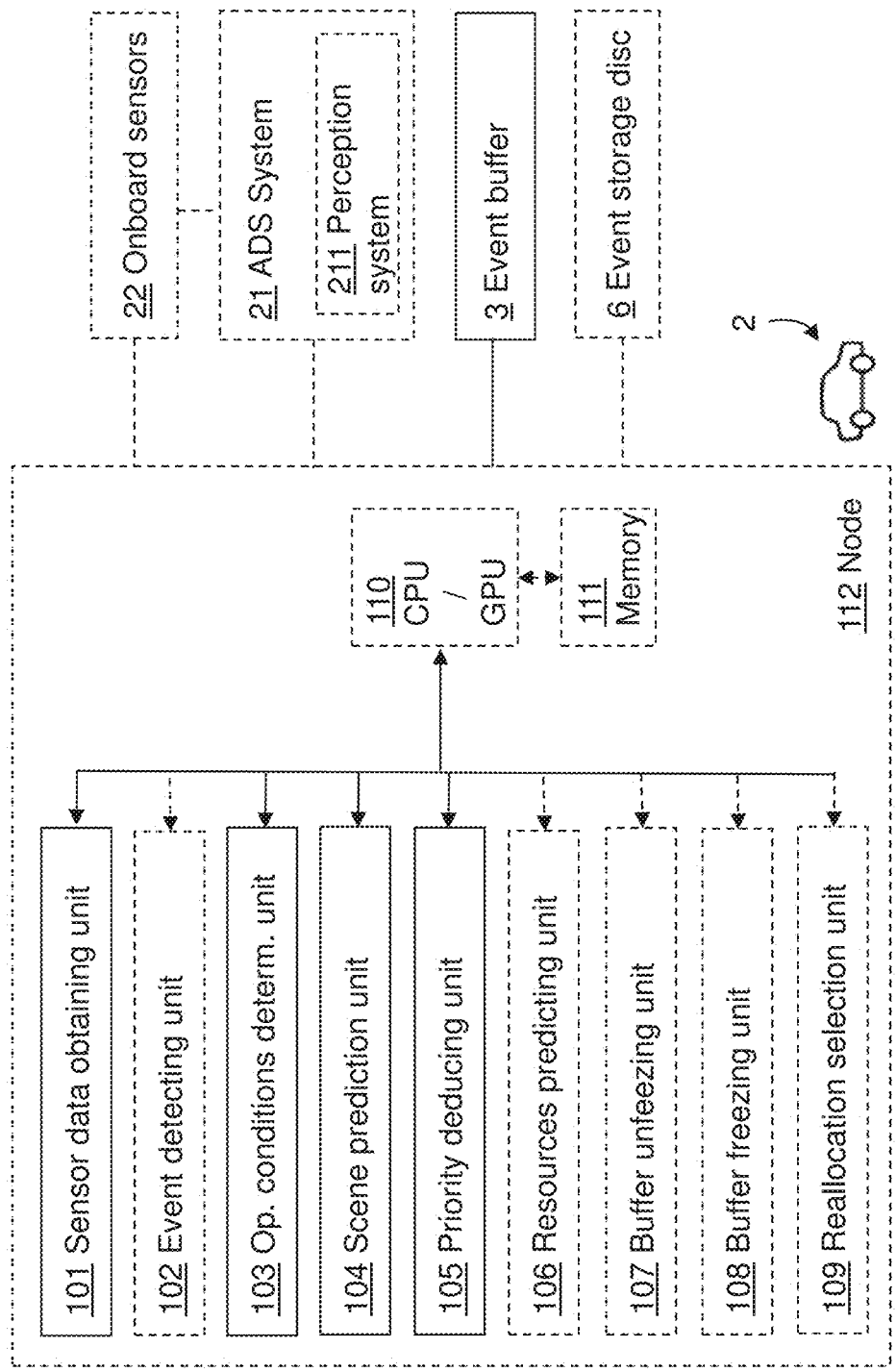
FIG. 1 is a schematic block diagram illustrating an exemplifying buffer resources prioritizing system according to embodiments of the disclosure.

Non-limiting embodiments of the present disclosure will now be described more fully hereinafter with reference to the accompanying drawings, in which currently preferred embodiments of the disclosure are shown. This disclosure may, however, be embodied in many different forms and should not be construed as limited to the embodiments set forth herein. Like reference characters refer to like elements throughout. Dashed lines of some boxes in the figures indicate that these units or actions are optional and not mandatory.

In the following, according to embodiments herein which relate to storage prioritization in an event buffer configured to continuously collect operational data of an ADS of a vehicle, there will be disclosed an approach supporting and/or enabling events deemed—e.g. most—valuable and/or important, to be captured and not lost.

Referring now to the figures, there is depicted in FIG. 1 a schematic block diagram illustrating an exemplifying buffer resources prioritizing system 1 according to embodiments of the disclosure. The buffer resources prioritizing system 1 is adapted and/or configured for storage prioritization in an event buffer 3 configured to continuously collect operational data of an ADS 21 of a vehicle 2, as illustrated in an exemplifying manner in FIG. 2. The event buffer 3 may be represented by any feasible at least first buffer—for instance a ring buffer and/or FIFO buffer e.g. offering temporary storage such as e.g. in RAM—intended and/or configured for buffering operational data—and selectively freeze i.e. store event data—such as captured scenarios, logs and/or measurement data pertaining to valuable driving and/or system events of the vehicle 2. The event buffer 3 may accordingly be configured for buffering and selectively freeze e.g. raw data and/or object-level data—e.g. associated with and/or from onboard sensors, buses, application interfaces etc.—and/or essentially entire and/or all data in the vehicle 2—pertinent a e.g. predeterminable time period.

The phrase "buffer resources prioritizing system" may refer to "buffer storage prioritizing system", "buffer prioritizing system" and/or "assessment system", whereas "a method performed by a buffer resources prioritizing system" may refer to "an at least partly computer-implemented method performed by a buffer resources prioritizing system". Moreover, "for storage prioritization in an event buffer" may refer to "for predictive storage prioritization in an event buffer", "for data storage prioritization in an event buffer", "for resources and/or memory prioritization in an event buffer", "for storage prioritization in a temporary event buffer e.g. a ring buffer", "for storage prioritization in an event recording buffer" and/or "for storage prioritization in a buffer, memory and/or data storage", and according to an example further to "for storage prioritization in a FIFO event buffer". The phrase "event buffer configured to continuously collect operational data of an ADS of a vehicle", on the other hand, may refer to "event buffer configured to continuously collect operational data pertinent and/or associated with an ADS of a vehicle", "event buffer configured to continuously buffer operational data of an ADS of a vehicle" and/or "event buffer configured to continuously and/or intermittently collect operational data of an ADS of a vehicle", and according to an example further to "event buffer configured to continuously buffer operational data and hold frozen event data of an ADS of a vehicle" and/or "event buffer configured to continuously buffer operational data of an ADS of a vehicle and selectively freeze and/or store event data and/or portions thereof".

Moreover, the vehicle 2—which may be referred to as host vehicle or ego-vehicle—may be represented by any arbitrary—e.g. known—manned or unmanned vehicle, for instance an engine-propelled or electrically-powered vehicle such as a car, truck, lorry, van, bus and/or tractor. Moreover, the term "vehicle" may refer to "autonomous and/or at least partly autonomous vehicle", "driverless and/or at least partly driverless vehicle", and/or "self-driving and/or at least partly self-driving vehicle", and according to an example further to "production vehicle", "fleet vehicle", "launched vehicle", "road-traffic vehicle" and/or "public road vehicle". Furthermore, the ADS 21 on-board the vehicle 2 may be represented by any arbitrary ADAS or AD system e.g. known in the art and/or yet to be developed. Moreover, the vehicle 2 and/or ADS 21 may comprise, be provided with and/or have onboard a perception system 211 adapted to estimate surroundings of the vehicle 2, and subsequently adapted to estimate world views of the surroundings e.g. with support from a—e.g. commonly known—digital map (not shown) such as a high definition, HD, map, and/or an equivalent and/or successor thereof. The perception system 211 may refer to any commonly known system, module and/or functionality, e.g. comprised in one or more electronic control modules, ECUs, and/or nodes of the vehicle 2 and/or the ADS 21, adapted and/or configured to interpret sensory information—relevant for driving of the vehicle 2—to identify e.g. objects, obstacles, vehicle lanes, relevant signage, appropriate navigation paths etc. The perception system 211—which may be adapted to support e.g. sensor fusion, tracking, localization etc.—may thus be adapted to rely on sensory information. Such exemplifying sensory information may, for instance, be derived from one or more—e.g. commonly known—sensors comprised in and/or provided onboard the vehicle 2 adapted to sense and/or perceive the vehicle's 2 whereabouts and/or surroundings, for instance represented by one or a combination of one or more of surrounding detecting sensors, such as image capturing devices e.g. camera(s), radar(s), lidar(s), ultrasonics etc., and/or a positioning system, odometer, inertial measurement units etc. In other words, a perception system 211 is in the present context thus to be understood as a system responsible for acquiring raw sensor data from onboard sensors, such as from surrounding detecting sensors etc., and converting this raw data into scene understanding.

As illustrated in an exemplifying manner in exemplifying FIG. 1, the buffer resources prioritizing system 1 is—e.g. by means of a sensor data obtaining unit 101—adapted and/or configured for obtaining sensor data of one or more sensors 22 onboard the vehicle 2. Thereby, there is e.g. continuously and/or intermittently—for instance while the vehicle 2 is traveling—derived and/or buffered from various onboard sensors 22, data indicative of current sensory information, such as e.g. from surrounding detecting sensors, brake sensor(s), and/or malfunction sensor(s), etc.

The sensor data may be obtained in any feasible—e.g. known—manner, such as continuously and/or intermittently, and further be obtained e.g. while the vehicle 2 is travelling and/or while standing still. Moreover, the sensor data may be of any feasible—e.g. known—format, and further the extent of sensor data obtained be of any feasible magnitude. The sensor(s) 22 may be represented by any feasible one or more—e.g. known—sensors onboard the vehicle 2 adapted to provide sensor data relevant in view of an ADS 21, for instance including one or more of surrounding detecting sensors adapted to capture surroundings of the vehicle 2 as those described above in conjunction with the ADS 21, driveline sensor(s), brake sensor(s), malfunction sensors, etc. The phrase "obtaining sensor data" may refer to "capturing, deriving and/or buffering sensor data" and/or "obtaining onboard said vehicle sensor data", and according to an example further to "obtaining continuously and/or intermittently sensor data". Moreover, "sensor data of one or more sensors" may refer to "sensor data from one or more sensors" and/or "sensor data captured by one or more sensors". According to an example, the phrase "obtaining sensor data of one or more sensors onboard said vehicle" may refer to "obtaining ADS-related status and/or state data, at least comprising sensor data of one or more sensors onboard said vehicle".

As illustrated in an exemplifying manner in exemplifying FIG. 1, the buffer resources prioritizing system 1 is further—e.g. by means of an operational conditions determining unit 103—adapted and/or configured for determining, at least partly based on the sensor data, current ADS-related operational conditions at least comprising states of vehicle surroundings and internal states of the vehicle 2. Thereby, there is derived ongoing or essentially ongoing—and/or recently ongoing e.g. ranging back a predeterminable time period e.g. up to several seconds—operational conditions affecting—and/or being relevant in view of—the ADS 21, including state(s) of vehicle surroundings and internal state(s) of the vehicle 2, and/or of the ADS 21 and/or of a software thereof.

The ADS-related operational conditions—which is derived at least partly from the obtained sensor data and/or deduced therefrom e.g. via an onboard perception system e.g. in a known manner and which additionally may be derived from within software of the ADS 21 and/or vehicle 2—may be represented by any feasible operational conditions affecting—and/or being deemed and/or identified relevant in view of—the ADS 21, at least comprising state(s) of vehicle surroundings and internal state(s) of the vehicle 2. The ADS-related operational conditions may accordingly be represented by state(s) of vehicle surroundings e.g. environmental circumstances such as e.g. weather and/or road type etc. and/or regional-related such as e.g. country of current vehicle position and/or country of vehicle registration etc., additionally e.g. represented by vehicle states such as e.g. speed, acceleration, active sensors etc. of the vehicle 2, driving state(s) of the vehicle 2 such as e.g. DDT (Dynamic Driving Task) and/or DDT Fallback etc., active feature type(s) of the vehicle 2, and further represented by internal state(s) e.g. condition(s), state(s), parameter value(s), signal(s) etc. within software—e.g. ADS software—such as e.g. of different algorithms used in the ADS 21 and/or vehicle 2 e.g. state(s) of a state machine and/or value(s) of one or more software parameters etc., and/or internal state(s) of the vehicle 2 such as e.g. measured from so called internal sensors 22 e.g. for the purpose of estimating actuator capabilities and/or state(s) of so called external sensors e.g. of a perception system 211, etc. The phrase "determining [ . . . ] current ADS-related operational conditions" may refer to "deriving and/or establishing [ . . . ] current ADS-related operational conditions", "determining [ . . . ] current operational conditions", "determining [ . . . ] current—or essentially current—ADS-related operational conditions", "determining [ . . . ] present, ongoing and/or recently ongoing ADS-related operational conditions, e.g. ranging and/or reaching back a predeterminable time range", "determining [ . . . ] current ADS-affecting operational conditions" and/or "determining [ . . . ] current ADS-related operating conditions", and according to an example further to "determining [ . . . ] current driving-related operational conditions". Moreover, "states of vehicle surroundings and internal states of said vehicle" may refer to "one or more states of vehicle surroundings and one or more internal states of said vehicle" and/or "states of vehicle surroundings and/or internal states of said vehicle", and according to an example further to "states of vehicle surroundings and internal states of said vehicle, said ADS and/or a software of said ADS".

As illustrated in an exemplifying manner in exemplifying FIG. 1, the buffer resources prioritizing system 1 is further—e.g. by means of a scene prediction unit 104—adapted and/or configured for determining an upcoming scene predicted to evolve from the determined current ADS-related operational conditions. Thereby, based on said conditions which at least comprises states of vehicle surroundings and internal states of the vehicle 2—for instance ranging back a predeterminable time range—there is predicted emanating from said operational conditions, a—e.g. triggering event-inducing—scene estimated to occur within a near future and/or at an upcoming point in time. Accordingly, there is predicted—for instance continuously and/or intermittently e.g. as the vehicle 2 is traveling—potential upcoming one or more scenes expected to invoke and/or call for data storage and/or data collection in the event buffer 3, of operational data of the vehicle 2.

The upcoming scene predicted to evolve may be determined in any feasible manner based on the current ADS-related operational conditions, which determined current ADS-related operational conditions e.g. may range back a predeterminable period of time such as less than a second up to several seconds or even tens of seconds. The upcoming scene predicted to evolve may accordingly for instance be determined by assessing said operational conditions, e.g. in view of similar pre-experienced and/or predefined operational conditions associated and/or pre-associated with scenes experienced and/or expected to evolve therefrom, e.g. in a lookup-manner and/or e.g. by feeding the determined operational conditions to an exemplifying neural network and/or machine learning model trained to—using as input the determined operational conditions—output potential scene(s) expected to evolve therefrom. According to an example, the upcoming scene may be determined with support from the optional onboard perception system 211. Moreover, the upcoming scene may be represented by surroundings of the vehicle 2 predicted to evolve from the determined current ADS-related operational conditions, at any given time instant ahead, for instance predicted to occur within a predeterminable time range and/or at a future point in time occurring within such a predeterminable time period e.g. ranging between less than a second up to several seconds or even up to tens of seconds. The upcoming scene may accordingly comprise and/or be represented by one or more of for instance dynamic elements such as dynamic objects' states and/or attributes and/or dynamic model-incompliant information, for instance scenery such as lane network e.g. lanes, conflict areas etc., stationary elements e.g. obstacles, curbs, traffic signs, traffic light positions, model-incompliant information etc., vertical elevation, environment condition etc., for instance self-representations of actors and/or observers such as skills and abilities e.g. field of view and/or occlusions, actors' and/or observers' states and/or attributes etc. Moreover, according to an example, the predicted upcoming scene may be associated with a scenario of any feasible time duration, for instance comprise one or more events. The predicted upcoming scene may further be represented by a triggering event-inducing scene thus relating to a predicted triggering event, accordingly expected to invoke and/or call for data storage and/or data collection in the event buffer 3, of operational data of the vehicle 2. A triggering event may—e.g. as known in the art—be represented by any feasible event such as an ADS-related event and/or ADS performance-related event—e.g. a critical event and/or safety critical event—complying with any criteria for scenario identification and/or event recording triggering criteria which in turn—e.g. as known in the art—may be represented by any feasible one or more conditions such as ADS-related conditions and/or ADS performance-related conditions stipulating under what circumstances event recording should be triggered, for instance represented by and/or comprising one or more of activation of a vehicle emergency braking system, dropping of a KPI value below—and/or exceeding—a predeterminable KPI threshold, a perception error and/or perception discrepancy exceeding a predeterminable limit, a difference in detected object free area between differing surrounding detecting sensors—such as e.g. camera and lidar—exceeding a predeterminable limit, overriding by a vehicle driver of an active driving mode of the ADS 21, stress level of a vehicle driver exceeding a predeterminable stress level threshold, discrepancy to a predeterminable extent between systems, certain behaviour of other vehicles, certain detected—e.g. strange—objects, certain rare events, etc. According to an example, the upcoming scene predicted to evolve may be determined additionally based on input from a heat map—e.g. referred to as a challenge heat map—comprising crucial location associated with past vehicle situations identified as critical and/or challenging. Further details relating to such a briefly mentioned challenge heat map may be found in the European Patent Application No. EP21170064 by the same applicant incorporated herein by reference, and will for the sake of brevity and conciseness not be further elaborated upon. The phrase "determining an upcoming scene" may refer to "estimating and/or predicting an upcoming scene", "determining a potential, estimated and/or assumed upcoming scene", "determining an evolving and/or future scene", "determining an upcoming at least first scene", "determining an upcoming scene of vehicle surroundings", "determining upcoming vehicle surroundings, such as surrounding—e.g. dynamic—elements, scenery and/or self-representations of actors and/or observers", and according to an example further to "determining a triggering event-related and/or triggering event—inducing upcoming scene" and/or "determining, e.g. with at least partial support from an onboard perception system, an upcoming scene". Moreover, "scene predicted to evolve from said current ADS-related operational conditions" may refer to "scene assumed to evolve from said current ADS-related operational conditions", "scene predicted to develop and/or emanate from said current ADS-related operational conditions" and/or "scene predicted to evolve when considering said current ADS-related operational conditions", and according to an example further to "scene predicted to evolve from said current ADS-related operational conditions within a predeterminable time range and/or at an upcoming point in time".

Figure 2:
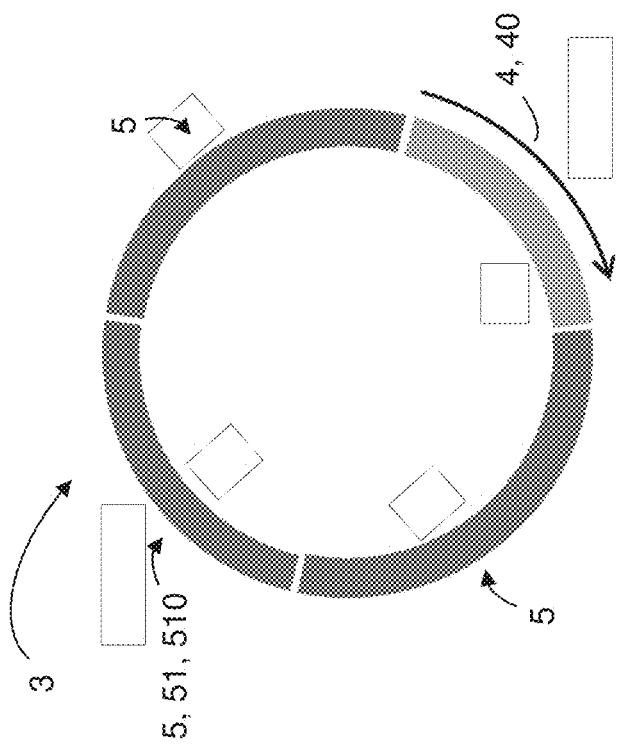
FIG. 2 depicts a schematic view of an exemplifying event buffer which storage is prioritized by an exemplifying buffer resources prioritizing system according to embodiments of the disclosure.

As illustrated in an exemplifying manner in exemplifying FIGS. 1 and 2, the buffer resources prioritizing system 1 is further—e.g. by means of a priority deducing unit 105—adapted and/or configured for deducing based on assessment of the predicted scene, a storage priority score 4 thereof reflecting predicted relevance of freezing event data of the predicted scene 40 in the event buffer 3. Thereby, by assessment of the predicted upcoming scene there is calculated and/or predicted the relevance of data collection in view thereof. That is, by analysing the—from the current ADS-related operational conditions—predicted upcoming scene, there is determined a priority 4 of said scene in terms of storing event data 40 associated therewith in the event buffer 3. Thus, a certain predicted upcoming scene may be deduced to be associated with a certain storage priority score, while another predicted upcoming scene may be deduced to be associated with another storage priority score, e.g. of higher—or lower—value. For instance, a predicted upcoming scene associated with a rare and/or edge event may be ranked higher—such as have a higher storage priority score—than another—e.g. more common—predicted upcoming scene. Accordingly, with the introduced concept, differing predicted scenes may be attributed and/or augmented with differing respective predicted storage priority scores 4, thus supporting and/or enabling predicted upcoming scenes to be predictively ranked and/or prioritized.

The storage priority score 4 of the predicted scene may be represented by any feasible value, such as e.g. a numerical value, of any feasible scale. Potentially, the storage priority score 4 may further be associated with and/or attributed with a confidence value indicating confidence related to the prediction of the upcoming scene and/or its storage priority score 4. Moreover, the storage priority score 4 of the predicted scene may be deduced in any feasible manner based on assessment of said scene, and further relate to any feasible one or more differing priority aspects and/or priority factors in view of event data of the predicted upcoming scene—e.g. in view of a predicted triggering event associated with the predicted upcoming scene and/or in view of one or more events underlying said triggering—such as e.g. learning potential thereof, rareness thereof, safety monitoring importance thereof, regression test importance thereof, legal compliance considerations thereof, etc. Differing priority aspects may be combined in any feasible manner to arrive at a resulting and/or combined storage priority score, such as e.g. using an averaging, median and/or weighting approach and/or scheme.

Thus, according to an example, a priority aspect may for instance be represented by learning potential and/or learning benefit(s) from event data of the predicted upcoming scene, e.g. for an ADS feature under development. Such a learning potential-related priority aspect—which hence may contribute to and/or represent the storage priority score 4—may for instance be determined and/or deduced by feeding the predicted upcoming scene and/or data associated therewith to e.g. a neural network and/or an exemplifying clustering algorithm trained on previous training and/or development data, e.g. previous training and/or development data of such an ADS feature. The development importance of such an ADS feature may also be considered; for instance, if a planned release date of said ADS feature is e.g. relatively far into the future and a predicted upcoming scene and/or data associated therewith—is expected to be only of e.g. moderate rareness, the probability that a similar situation and/or scene may again be expected and/or experienced e.g. well before the release of said feature, could potentially decrease the relative importance of freezing event data of the predicted scene in the event buffer 3, thus rendering a relatively low predicted relevance and subsequently deducing a relatively low storage priority score 4. Additionally or alternatively, a priority aspect may further for instance be represented by rareness of event data of the predicted upcoming scene. Such a rareness-related priority aspect—which hence may contribute to and/or represent the storage priority score 4—may for instance be determined and/or deduced by anomaly detection, and/or by identifying a scenario associated with the predicted upcoming scene and/or by deploying a model to quantify the predicted upcoming scene and/or data associated therewith, and e.g. relate it to a preconstructed statistical model—e.g. a probability distribution of a scenario space—to measure the relative probability of the triggering event and/or one or more events underlying said triggering event, occurring. Moreover, additionally or alternatively, a priority aspect may further for instance be represented by safety monitoring importance—e.g. through the use of KPI (Key Performance Indicator) values e.g. safety KPIs such as relating to e.g. PET (Post Encroachment Time), BTN (Brake Threat Number), TTC (Time To Collision) etc., —of event data of the predicted upcoming scene. Such a safety monitoring importance-related priority aspect—which hence may contribute to and/or represent the storage priority score 4—may for instance be determined and/or deduced by predicting said safety monitoring importance e.g. KPI value from assessment of the predicted upcoming scene and/or data associated therewith. According to an example, such safety monitoring importance e.g. KPI value may be constructed at least partly based on pre-preprocessed data, i.e. based on corroborated and/or enhanced data, e.g., achieved by running at least a portion and/or range of data associated with the predicted upcoming scene through backward filter(s), which may increase the accuracy of e.g. state data and/or e.g. decrease and/or minimize a probability of missing important information in the surrounding of the vehicle 2. Furthermore, additionally or alternatively, a priority aspect may for further for instance be represented by importance of subsequent regression tests, verification and/or validation of event data of the predicted upcoming scene. Such a regression test importance-related priority aspect—which hence may contribute to and/or represent the storage priority score 4—may for instance be determined and/or deduced through comparison of the predicted upcoming scene and/or data associated therewith to previously collected and/or prestored data, for instance by feeding the predicted upcoming scene and/or data associated therewith to e.g. a neural network trained on previous training and/or development data. Moreover, additionally or alternatively, a priority aspect may further for instance be represented by legal compliance considerations of storing event data. Such a legal compliance considerations-related priority aspect—which hence may contribute to and/or represent the storage priority score 4—may for instance be determined and/or deduced by taking into consideration storage of data associated with the predicted upcoming scene being bound by legal compliance; for instance, certain ADS 21 behaviour(s) and/or certain traffic situation(s) may warrant storage for legal compliance. Respective potential model utilized for—and/or contributing to—deducing and/or determining the storage priority score 4 may potentially be—e.g. repeatedly—updated e.g. to reflect current properties and/or states of the ADS 21. For instance, the model exemplified above for deriving learning potential, may potentially be continuously updated e.g. along with updates to the feature(s) considered. Further, the models may be hardware and or software version dependent; for instance, a newly installed onboard e.g. camera of a next generation platform may have other value of collecting certain data than a comparably older camera which may already have had plenty of operational time.

The phrase "deducing based on assessment of the predicted scene" may refer to "determining, predicting, calculating, deriving, setting and/or estimating based on assessment of the predicted scene", "deducing by assessing the predicted scene" and/or "deducing by using the predicted scene as input", whereas "storage priority score" throughout the disclosure may refer to "data collection priority score", "freezing priority score", "storage ranking, relevance and/or importance score", "storage priority" and/or "storage priority value". "A storage priority score thereof", on the other hand, may refer to "a predicted storage priority score thereof" and/or "a storage priority score of said predicted scene", and according to an example further to "a storage priority score thereof e.g. along with and/or attributed with a determined and/or estimated confidence value". Moreover, "reflecting predicted relevance" may refer to "indicating predicted relevance", whereas "of freezing event data of the predicted scene in said event buffer" may refer to "of storing and/or collecting event data of the predicted scene in said event buffer", "of freezing event data of at least a portion of the predicted scene in said event buffer", "of freezing event data associated with and/or pertinent the predicted scene in said event buffer" and/or "of freezing operational data of the ADS and/or vehicle pertinent the predicted scene in said event buffer".

Optionally, and as illustrated in an exemplifying manner in exemplifying FIGS. 1 and 2, the buffer resources prioritizing system 1 may further—e.g. by means of an optional buffer unfreezing unit 107—be adapted and/or configured for unfreezing in the event buffer 3, provided the event buffer 3 currently comprises one or more frozen events 5, at least a first frozen event 51 having a storage priority score 510 which in comparison to the deduced storage priority score 4 of the predicted scene renders the at least first frozen event 51 lower prioritized. Thereby, should the predicted upcoming scene be predictively higher prioritized than at least a first event 51—or event data associated therewith—already stored in the event buffer 3, such as by having a higher storage priority score 4 e.g. with a predeterminable margin and/or confidence, then the at least first frozen event and/or its associated event data—e.g. the frozen event(s) 51 with the lowest storage priority score(s) 510—may be discarded from the event buffer 3. In that manner, resources such as buffer storage, memory, area, room and/or space of the event buffer 3 may be released in advance, that is prior to the predicted upcoming scene even having occurred, such as prior to a predicted triggering event associated with the predicted upcoming scene—and/or one or more events leading up to said triggering event e.g. comprising an onset thereof—having occurred and/or played out. Accordingly, previous events 51 stored in the event buffer 3 may be predictively unfrozen in case new predicted events are deemed to be of higher importance. In other words, there is suggested predictively prioritizing among expected event(s)—and/or currently experienced events—and previously collected ones 5, to aim for and/or ensure storing—e.g. the most—valuable ones. Thus, should a deduced storage priority score 4 of a predicted upcoming scene come out on top in comparison to priority score(s) 510 of one or more already frozen events 51, i.e. be concluded to be higher prioritized, then such already frozen event(s) 51—and/or the event data associated therewith—thus being considered of less importance may be unfrozen, such as the frozen event 51 with the lowest priority score being unfrozen first, to give room for the expected—and/or presently experienced—event(s), e.g. including its upcoming and/or future evolution.

The one or more events 5 already frozen in the event buffer 3, may be represented by any feasible number of frozen events 5, for instance ranging from merely one up to tens, hundreds or even thousands thereof, e.g. depending on the capacity of the event buffer 3 and/or volume of event data of respective frozen event 5. Moreover, respective storage priority score of the frozen event(s) 5 in the event buffer 3 may have been set in any feasible manner, for instance in the manner suggested herein. The amount of frozen events 51 being predictively unfrozen may be of any feasible number, for instance range from a single frozen event up to several or tens thereof or even more. Optionally, and as illustrated in an exemplifying manner in exemplifying FIGS. 1 and 2, the buffer resources prioritizing system 1 may further—e.g. by means of an optional resources predicting unit 106—be adapted and/or configured for predicting amount of event buffer resources required for storing event data 40 of the predicted scene. Unfreezing at least a first frozen event 51 may then optionally comprise—and/or the optional buffer unfreezing unit 107 may then optionally be adapted and/or configured for—unfreezing resources of the event buffer 3 at least to the predicted amount. Thereby, it may be estimated number of already stored events 5—and/or extent and/or volume of already stored event data—predicted to be needed to be unfrozen to release buffer resources enough to enable freezing event data 40 of the predicted upcoming scene in the event buffer 3. The amount of event buffer resources required for storing event data 40 of the predicted scene may be predicted and/or estimated in any feasible manner, for instance by assessing the determined ADS-related operational conditions. Furthermore, unfreezing at least a first frozen event 51 may optionally comprise—and/or the optional buffer unfreezing unit 107 may optionally be adapted and/or configured for—unfreezing at least a first frozen event 51, further provided the one or more frozen events 5 renders a remaining capacity of the event buffer 3 insufficient. Thereby, already stored event(s) 51 considered lower prioritized than the predicted scene, is/are only unfrozen additionally given that remaining capacity—e.g. storage capacity and/or buffer area—of the event buffer 3 is below a predeterminable level and/or threshold, e.g. less than a predeterminable capacity of the event buffer 3 remaining. In this manner, should there be sufficient buffer capacity left, e.g. even with the predicted upcoming scene coming in, already frozen event(s) 51—although being lower prioritized than the predicted scene—may remain kept in the event buffer 3 without being exposed to being predictively unfrozen.

The phrase "unfreezing in said event buffer" may refer to "releasing and/or discarding in said event buffer", whereas "provided said event buffer currently comprises one or more frozen events" may refer to "when said event buffer currently comprises one or more frozen events", "provided said event buffer comprises one or more frozen events", "provided said event buffer currently comprises one or more stored events" and/or "provided said event buffer currently comprises one or more already frozen events". Moreover, "at least a first frozen event having a storage priority score" may refer to "at least a portion of" at least a first frozen event having a storage priority score, "event data of at least a first frozen event having a storage priority score", "at least a first frozen event out of said one or more frozen events having a storage priority score" and/or "at least a first frozen event associated, attributed and/or augmented with a storage priority score". The phrase "renders said at least first frozen event lower prioritized", on the other hand, may refer to "is interpreted as, yields and/or infers said at least first frozen event lower prioritized" and/or "renders said at least first frozen event comparably lower prioritized", and according to an example further to "renders said at least first frozen event lower prioritized, for instance by said at least first frozen event having a storage priority score lower than the deduced storage priority score of the predicted scene", "renders said at least first frozen event lower prioritized, for instance by said at least first frozen event having a storage priority score lower than the deduced storage priority score of the predicted scene and further having the lowest storage priority score of the one or more frozen events", "renders said at least first frozen event lower prioritized, for instance by said at least first frozen event having a storage priority score lower than the deduced storage priority score of the predicted scene with a predeterminable margin and/or confidence" and/or "renders said at least first frozen event lower prioritized taking into consideration in the comparison a confidence value associated with the predicted scene and/or its storage priority score".

Optionally, and as illustrated in an exemplifying manner in exemplifying FIGS. 1 and 2, the buffer resources prioritizing system 1 may further—e.g. by means of an optional buffer freezing unit 108—be adapted and/or configured for freezing in the event buffer 3, event data 40 associated with the predicted scene. Thereby, operational data 40 pertinent said predicted scene—and/or a scene actually unfolding—may be stored in the event buffer 3, for instance once experienced and/or having played out.

Furthermore, optionally, and as illustrated in an exemplifying manner in exemplifying FIGS. 1 and 2, the buffer resources prioritizing system 1 may further—e.g. by means of an optional reallocation selection unit 109—be adapted and/or configured for selecting at least a first frozen event 5 for reallocation to another onboard storage device 6, based on the at least first frozen event's 5 storage priority score. Thereby, one or more events 5 stored in the event buffer 3 may—taking into consideration respective stored event's 5 storage priority score—be selected for reallocation to at least a first other—e.g. more pertinent—event storage device, medium, unit, drive and/or disc 6, such as e.g. an onboard hard disc and/or solid state drive, for instance to unburden the event buffer 3. Which frozen event(s) 5 to be filtered out for reallocation to, dumping at and/or for additional storage at said storage device 6, may be determined in any feasible manner taking into account respective frozen event's 5 storage priority score, for instance selecting frozen event(s) 5 with highest—and/or lowest—storage priority score(s) and/or frozen event(s) 5 with storage priority score(s) exceeding—and/or being below—a predeterminable threshold and/or level. Moreover, number of frozen events 5 to optionally reallocate to said storage device may e.g. be determined taking into consideration deterioration aspects and/or cost of the storage device 6.

Potentially, and as illustrated in an exemplifying manner in exemplifying FIG. 1, the buffer resources prioritizing system 1 may further—e.g. by means of an optional event detecting unit 102—be adapted and/or configured for identifying upon the sensor data potentially rendering fulfilment—and/or a state of a software of the ADS 21 rendering fulfilment—of event recording triggering criteria, conditions of a triggering event underlying said fulfilment. Thereby, subsequent detection of a potential event meeting the event recording triggering criteria, there is determined circumstances of the triggering event. That is, following occurrence of a potential event invoking and/or initiating data storage and/or data collection in said event buffer 3 of operational data of the vehicle 2, there is derived the circumstances of the triggering event e.g. the type and/or category thereof, such as perception-related error, KPI exceedance, etc. Detecting occurrence of a triggering event may be accomplished in any feasible—e.g. known—manner, whether said triggering event is derived from sensor data or a state of—or in—an ADS-related software. Determining an upcoming scene may then potentially comprise—and/or the scene prediction unit 104 may then optionally be adapted and/or configured for—determining an upcoming scene predicted to evolve additionally based on the triggering event conditions. The phrase "identifying [ . . . ] conditions of a triggering event underlying said fulfilment" may refer to "deriving, assessing, determining, categorizing and/or classifying [ . . . ] conditions of a triggering event underlying said fulfilment", "identifying [ . . . ] circumstances and/or characteristics of a triggering event underlying said fulfilment", "identifying [ . . . ] conditions of a triggering event behind and/or causing said fulfilment", and according to an example further to "identifying [ . . . ] event type and/or category of a triggering event underlying said fulfilment". The phrase "upon [ . . . ] rendering fulfilment of event recording criteria", on the other hand, may refer to "when and/or provided [ . . . ] rendering fulfilment of event recording criteria", "upon [ . . . ] exhibiting and/or leading to fulfilment of event recording criteria", "upon [ . . . ] fulfilling event recording criteria", "upon [ . . . ] rendering fulfilment of at least a first event triggering condition", "upon [ . . . ] rendering fulfilment of predeterminable event recording criteria", "upon [ . . . ] rendering fulfilment of triggering criteria" and/or "upon [ . . . ] rendering fulfilment of event and/or scenario recording criteria stipulating conditions for under what circumstances—and/or for which events and/or scenarios—event and/or scenario recording and/or data storage should be triggered". Moreover, "upon said sensor data rendering fulfilment" may refer to "upon at least a portion of said sensor data rendering fulfilment" and/or "upon said sensor data contributing to rendering fulfilment", whereas "upon [ . . . ] a state of a software of the ADS rendering fulfilment" may refer to "upon [ . . . ] a derived and/or determined state of a software of the ADS rendering fulfilment" and/or "upon [ . . . ] a state of a software of the ADS contributing to rendering fulfilment". According to an example, the phrase "identifying, upon said sensor data rendering fulfilment—and/or a state of a software of the ADS rendering fulfilment—of event recording triggering criteria, conditions of a triggering event underlying said fulfilment" may refer to "detecting occurrence of a triggering event and identifying conditions—e.g. type and/or category—of said triggering event".

As further shown in FIG. 1, the buffer resources prioritizing system 1 comprises a sensor data obtaining unit 101, an optional event detecting unit 102, an operational conditions determining unit 103, a scene prediction unit 104, a priority deducing unit 105, an optional resources predicting unit 106, an optional buffer unfreezing unit 107, an optional buffer freezing unit 108 and an optional reallocation selection unit 109, all of which already have been described in greater detail above. Furthermore, the embodiments herein for storage prioritization in an event buffer 3 configured to continuously collect operational data of an ADS 21 of a vehicle 2, may be implemented through one or more processors, such as a processor 110, for instance represented by at least a first Central Processing Unit, CPU, at least a first Graphics Processing Unit, GPU, at least a first Tensor Processing Unit, TPU, and/or at least a first Field-Programmable Gate Array, FPGA, together with computer program code for performing the functions and actions of the embodiments herein. Said program code may also be provided as a computer program product, for instance in the form of a data carrier carrying computer program code for performing the embodiments herein when being loaded into the buffer resources prioritizing system 1. One such carrier may be in the form of a CD/DVD ROM disc and/or a hard drive, it is however feasible with other data carriers. The computer program code may furthermore be provided as pure program code on a server and downloaded to the buffer resources prioritizing system 1. The buffer resources prioritizing system 1 may further comprise a memory 111 comprising one or more memory units. The memory 111 optionally includes high-speed random access memory, such as DRAM, SRAM, DDR RAM, or other random access solid-state memory devices, and further optionally includes non-volatile memory, such as one or more magnetic disk storage devices, optical disk storage devices, flash memory devices, or other non-volatile solid-state storage devices. Moreover, the memory may be arranged to be used to store e.g. information, and further to store data, configurations, scheduling, and applications, to perform the methods herein when being executed in the buffer resources prioritizing system 1. For instance, the computer program code may be implemented in the firmware, stored in FLASH memory 111, of an embedded processor 110, and/or downloaded wirelessly e.g. from an off-board server.

Furthermore, units 101-109, the optional processor 110 and/or the optional memory 111, may at least partly be comprised in one or more nodes 112 e.g. ECUs of the vehicle 2, e.g. in and/or in association with the ADS 21. Those skilled in the art will also appreciate that said units 101-109 described above as well as any other unit, interface, system, controller, module, device, element, feature, or the like described herein may refer to, comprise, include, and/or be implemented in or by a combination of analog and digital circuits, and/or one or more processors configured with software and/or firmware, e.g. stored in a memory such as the memory 111, that when executed by the one or more processors such as the processor 110 perform as described herein. One or more of these processors, as well as the other digital hardware, may be included in a single Application-Specific Integrated Circuitry, ASIC, or several processors and various digital hardware may be distributed among several separate components, whether individually packaged or assembled into a System-on-a-Chip, SoC.

Figure 3:
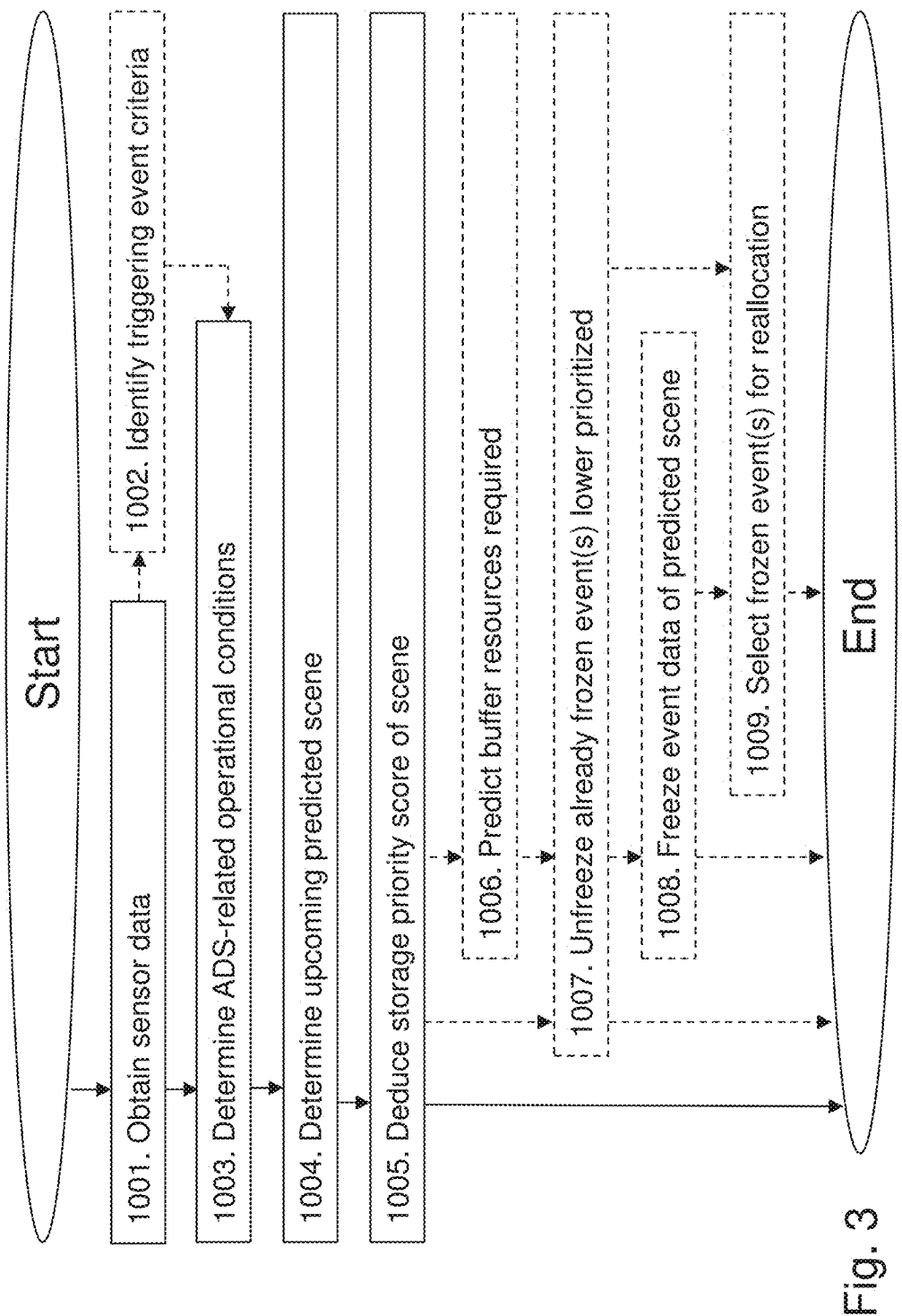
FIG. 3 is a flowchart depicting an exemplifying method performed by a buffer resources prioritizing system according to embodiments of the disclosure.

FIG. 3 is a flowchart depicting an exemplifying method performed by a buffer resources prioritizing system 1 according to embodiments of the disclosure. Said method is for storage prioritization in an event buffer 3 configured to continuously collect operational data of an ADS 21 of a vehicle 2. The exemplifying method, which may be continuously repeated, comprises one or more of the following actions discussed with support from FIGS. 1 and 2. Moreover, the actions may be taken in any suitable order and/or one or more actions may be performed simultaneously and/or in alternate order where applicable. For instance, optional Actions 1008 and 1009 may be performed in alternate order and/or simultaneously.

Action 1001
In Action 1001, the buffer resources prioritizing system 1 obtains—e.g. with support from the sensor data obtaining unit 101—sensor data of one or more sensors 22 onboard the vehicle 2.

Action 1002
In optional Action 1002, the buffer resources prioritizing system 1 may potentially and/or optionally identify—e.g. with support from the optional event detecting unit 102—upon the sensor data rendering fulfilment—and/or a state of a software of the ADS 21 rendering fulfilment—of event recording triggering criteria, conditions of a triggering event underlying said fulfilment.

Action 1003
In Action 1003, the buffer resources prioritizing system 1 determines—e.g. with support from the operational conditions determining unit 103—at least partly based on the sensor data, current ADS-related operational conditions at least comprising states of vehicle surroundings and internal states of the vehicle 2.

Action 1004
In Action 1004, the buffer resources prioritizing system 1 determines—e.g. with support from the scene prediction unit 104—an upcoming scene predicted to evolve from the current operational conditions.

Potentially and/or optionally, should Action 1004 be preceded by optional Action 1002 of identifying conditions of a triggering event, then Action 1004 of determining an upcoming scene may potentially comprise—and/or the scene prediction unit 104 may then optionally be adapted and/or configured for—determining an upcoming scene predicted to evolve additionally based on the triggering event conditions.

Action 1005
In Action 1005, the buffer resources prioritizing system 1 deduces—e.g. with support from the priority deducing unit 105—based on assessment of the predicted scene, a storage priority score 4 thereof reflecting predicted relevance of freezing event data 40 of the predicted scene in the event buffer 3.

Action 1006
In optional Action 1006, the buffer resources prioritizing system 1 may optionally predict—e.g. with support from the optional resources predicting unit 106—amount of event buffer resources required for storing event data 40 of the predicted scene.

Action 1007
In optional Action 1007, the buffer resources prioritizing system 1 may optionally unfreeze—e.g. with support from the optional buffer unfreezing unit 107—in the event buffer 3, provided said event buffer currently comprises one or more frozen events 5, at least a first frozen event 51 having a storage priority score 510 which in comparison to the deduced storage priority score 4 of the predicted scene renders the at least first frozen event 51 lower prioritized.

Optionally, Action 1007 of unfreezing at least a first frozen event 51 may comprise—and/or the optional buffer unfreezing unit 107 may optionally be adapted and/or configured for—unfreezing at least a first frozen event 51, further provided the one or more frozen events 5 renders a remaining capacity of the event buffer 3 insufficient.

Furthermore, optionally, should Action 1007 follow upon optional Action 1006 of predicting amount of event buffer resources required for storing event data 40 of the predicted scene, then Action 1007 of unfreezing at least a first frozen event 51 may comprise—and/or the optional buffer unfreezing unit 107 may optionally be adapted and/or configured for—unfreezing resources of the event buffer 3 at least to the predicted amount.

Action 1008

In optional Action 1008, the buffer resources prioritizing system 1 may optionally freeze—e.g. with support from the optional buffer freezing unit 108—in the event buffer 3, event data 40 associated with the predicted scene.

Action 1009

In optional Action 1009, the buffer resources prioritizing system 1 may optionally select—e.g. with support from the optional reallocation selection unit 109—at least a first frozen event 5 for reallocation to another onboard storage device 6, based on the at least first frozen event's 5 storage priority score.

The person skilled in the art realizes that the present disclosure by no means is limited to the preferred embodiments described above. On the contrary, many modifications and variations are possible within the scope of the appended claims. It should furthermore be noted that the drawings not necessarily are to scale and the dimensions of certain features may have been exaggerated for the sake of clarity. Emphasis is instead placed upon illustrating the principle of the embodiments herein. Additionally, in the claims, the word "comprising" does not exclude other elements or steps, and the indefinite article "a" or "an" does not exclude a plurality.

The invention claimed is:

1. A method performed by a buffer resources prioritizing system for storage prioritization in an event buffer configured to continuously collect operational data of an Automated Driving System, ADS, of a vehicle, the method comprising:
   obtaining sensor data of one or more sensors onboard the vehicle;
   determining, at least partly based on the sensor data, current and recently ongoing ADS-related operational conditions at least comprising states of vehicle surroundings and internal states of the vehicle, the recently ongoing ADS-related operational conditions being ADS-related operational conditions ranging back a predetermined time period;
   determining, by assessment of the current and recently ongoing ADS-related operational conditions, an upcoming scene predicted to evolve from the current and recently ongoing ADS-related operational conditions;
   deducing, based on assessment of the predicted scene, a predicted storage priority score in view of event data thereof reflecting predicted relevance of freezing the event data of the predicted scene in the event buffer, the event buffer being configured to continuously buffer operational data and hold frozen event data;
   unfreezing in the event buffer, provided the event buffer currently comprises one or more frozen events each having a respective storage priority score, at least a first frozen event having a lower storage priority score in comparison to the deduced predicted storage priority score of the predicted scene;
   selecting those of the one or more frozen events whose respective storage priority score is below a threshold; and
   causing reallocation of the selected one or more frozen events to another onboard storage device.

2. The method according to claim 1, wherein the unfreezing comprises unfreezing at least the first frozen event, further provided the one or more frozen events renders a remaining capacity of the event buffer insufficient.

3. The method according to claim 2, further comprising:
   predicting an amount of event buffer resources required for storing event data of the predicted scene;
   wherein the unfreezing at least a first frozen event comprises unfreezing resources of the event buffer at least to the predicted amount.

4. The method according to claim 2, further comprising:
   freezing in the event buffer, event data associated with the predicted scene.

5. The method according to claim 2, further comprising:
   selecting at least the first frozen event for reallocation to another onboard storage device, based at least on the first frozen event's storage priority score.

6. The method according to claim 1, further comprising:
   predicting an amount of event buffer resources required for storing event data of the predicted scene;
   wherein the unfreezing at least the first frozen event comprises unfreezing resources of the event buffer at least to the predicted amount.

7. The method according to claim 1, further comprising:
   freezing in the event buffer, event data associated with the predicted scene.

8. The method according to claim 1, further comprising:
   selecting at least the first frozen event for reallocation to another onboard storage device, based at least on the first frozen event's storage priority score.

9. A buffer resources prioritizing system for storage prioritization in an event buffer configured to continuously collect operational data of an Automated Driving System, ADS, of a vehicle, the buffer resources prioritizing system comprising one or more processors configured to:
   obtain sensor data of one or more sensors onboard the vehicle;
   determine, at least partly based on the sensor data, current and recently ongoing ADS-related operational conditions at least comprising states of vehicle surroundings and internal states of the vehicle, the recently ongoing ADS-related operational conditions being ADS-related operational conditions ranging back a predetermined time period;
   determine, by assessment of the current and recently ongoing ADS-related operational conditions, an upcoming scene predicted to evolve from the current ADS-related operational conditions;
   deduce, based on assessment of the predicted scene, a predicted storage priority score in view of event data thereof reflecting predicted relevance of freezing the event data of the predicted scene in the event buffer, the event buffer being configured to continuously buffer operational data and hold frozen event data;
   unfreeze the event buffer, provided the event buffer currently comprises one or more frozen events each having a respective storage priority score, at least a first frozen event having a lower storage priority score in comparison to the deduced predicted storage priority score of the predicted scene;
   select those of the one or more frozen events whose respective storage priority score is below a threshold; and
   cause reallocation of the selected one or more frozen events to another onboard storage device.

10. The buffer resources prioritizing system according to claim 9, wherein the one or more processors are one or both of adapted and configured for unfreezing at least the first frozen event, further provided the one or more frozen events renders a remaining capacity of the event buffer insufficient.

11. The buffer resources prioritizing system according to claim 10, wherein the one or more processors are further configured to:
predict an amount of event buffer resources required for storing event data of the predicted scene;
unfreeze resources of the event buffer at least to the predicted amount.

12. The buffer resources prioritizing system according to claim 10, wherein the one or more processors are further configured to:
freeze in the event buffer, event data associated with the predicted scene.

13. The buffer resources prioritizing system according to claim 10, wherein the one or more processors are further configured to:
select at least the first frozen event for reallocation to another onboard storage device, based on the at least first frozen event's storage priority score.

14. The buffer resources prioritizing system according to claim 9, wherein the one or more processors are further configured to:
predict an amount of event buffer resources required for storing event data of the predicted scene;
unfreeze resources of the event buffer at least to the predicted amount.

15. The buffer resources prioritizing system according to claim 9, wherein the one or more processors are further configured to:
freeze in the event buffer, event data associated with the predicted scene.

16. The buffer resources prioritizing system according to claim 9, wherein the one or more processors are further configured to:
select at least the first frozen event for reallocation to another onboard storage device, based on the at least first frozen event's storage priority score.

17. The buffer resources prioritizing system according to claim 9, wherein the buffer resources prioritizing system is comprised in the vehicle.

18. A non-volatile computer readable storage medium storing a computer program containing computer program code arranged to cause one of a computer and a processor to perform a method for storage prioritization in an event buffer configured to continuously collect operational data of an Automated Driving System, ADS, of a vehicle, the method comprising:

obtaining sensor data of one or more sensors onboard the vehicle;

determining, at least partly based on the sensor data, current and recently ongoing ADS-related operational conditions at least comprising states of vehicle surroundings and internal states of the vehicle;

determining, by assessment of the current and recently ongoing ADS-related operational conditions, an upcoming scene predicted to evolve from the current and recently ongoing ADS-related operational conditions, the recently ongoing ADS-related operational conditions being ADS-related operational conditions ranging back a predetermined time period;

deducing, based on assessment of the predicted scene, a predicted storage priority score in view of event data thereof reflecting predicted relevance of freezing the event data of the predicted scene in the event buffer, the event buffer being configured to continuously buffer operational data and hold frozen event data;

unfreezing in the event buffer, provided the event buffer currently comprises one or more frozen events each having a respective storage priority score, at least a first frozen event having a lower storage priority score in comparison to the deduced predicted storage priority score of the predicted scene;

selecting those of the one or more frozen events whose respective storage priority score is below a threshold; and causing reallocation of the selected one or more frozen events to another onboard storage device.

* * * * *